(12) United States Patent
Chen et al.

(10) Patent No.: US 12,390,771 B2
(45) Date of Patent: Aug. 19, 2025

(54) RIGID SELF-SUPPORTING MXene SEPARATION MEMBRANE AND PREPARATION METHOD AND USE THEREOF

(71) Applicant: Dalian University of Technology, Dalian (CN)

(72) Inventors: Shuo Chen, Dalian (CN); Chengyu Yuan, Dalian (CN); Qi Zhang, Dalian (CN); Gaoliang Wei, Dalian (CN); Xie Quan, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 475 days.

(21) Appl. No.: 18/083,155

(22) Filed: Dec. 16, 2022

(65) Prior Publication Data

US 2023/0191338 A1 Jun. 22, 2023

(30) Foreign Application Priority Data

Dec. 22, 2021 (CN) .......................... 202111579747.3

(51) Int. Cl.
*B01D 71/02* (2006.01)
*B01D 67/00* (2006.01)
(Continued)

(52) U.S. Cl.
CPC ... *B01D 71/0221* (2022.08); *B01D 67/00416* (2022.08); *B01D 67/0058* (2013.01); *B01D 67/006* (2013.01); *B01D 67/0076* (2013.01); *B01D 69/02* (2013.01); *B01D 71/021* (2013.01); *C01B 32/907* (2017.08); *C01B 32/921* (2017.08); *B01D 2323/08* (2013.01); *B01D 2323/10* (2013.01); *B01D 2323/12* (2013.01); *B01D 2323/21815* (2022.08); *B01D 2323/21817* (2022.08); *B01D 2323/28* (2013.01);
(Continued)

(58) Field of Classification Search
None
See application file for complete search history.

(56) References Cited

FOREIGN PATENT DOCUMENTS

CN 112967923 A1 * 1/2021

OTHER PUBLICATIONS

Long et al., "Self-assembly enabled nano-intercalation for stable high-performance MXene membranes," Journal of Membrane Science 635 (2021) 119464 (Year: 2021).*

* cited by examiner

*Primary Examiner* — Krishnan S Menon
(74) *Attorney, Agent, or Firm* — NKL Law; Allen Xue

(57) ABSTRACT

The present disclosure provides a rigid self-supporting MXene separation membrane and a preparation method and use thereof, belonging to the technical field of membranes. In the present disclosure, a MXene material is mixed with an aluminum salt powder to conduct one-step membrane formation by hot-pressing. The pressure forms the powder into a membrane and imparts rigidity, enabling a self-supporting structure; the heating breaks an ionic bond of an inorganic metal salt to reach a molten ionic state, and free metal cations react with active oxygen-containing functional groups on the surface of the MXene to form new chemical bonds (such as an Al—O bond); such a chemical bond has higher energy, achieving a desirable anti-swelling effect to improve the membrane stability. The separation membrane further has excellent conductivity and hydrophilicity.

10 Claims, 11 Drawing Sheets

(51) Int. Cl.
*B01D 69/02* (2006.01)
*C01B 32/907* (2017.01)
*C01B 32/921* (2017.01)

(52) U.S. Cl.
CPC ...... *B01D 2323/36* (2013.01); *B01D 2323/56* (2022.08); *B01D 2325/26* (2013.01); *B01D 2325/28* (2013.01); *B01D 2325/36* (2013.01)

FIG. 1A  FIG. 1B

RIGID SELF-SUPPORTING MXene SEPARATION MEMBRANE AND PREPARATION METHOD AND USE THEREOF

CROSS-REFERENCE TO RELATED APPLICATIONS

This application claims the benefit and priority of Chinese Patent Application No. 202111579747.3, filed with the China National Intellectual Property Administration on Dec. 22, 2021, the disclosure of which is incorporated by reference herein in its entirety as part of the present application.

FIELD

The present technology relates to the technical field of membranes, in particular to a rigid self-supporting MXene separation membrane and a preparation method and use thereof.

INTRODUCTION

In the 21st century, water shortage has become increasingly serious, and seawater desalination has become an effective way to relieve water shortage. Membrane separation, as a desalination technology, features low energy consumption, high efficiency, and no phase change. Meanwhile, two-dimensional nanomaterials represented by graphene have attracted great attention in seawater desalination due to their special morphological structure and desirable chemical stability. As a new two-dimensional material, MXene is easier to prepared than graphene, with better conductivity and hydrophilicity. The MXene has a unique nano-scale interlamellar structure to be used as a membrane channel for selective screening. Therefore, MXene is an ideal seawater desalination membrane material. The mechanical strength of MXene membranes for seawater desalination needs to be improved by loading with a porous substrate, which may reduce inherent conductivity and hydrophilicity of the material. Compared with supported membranes, self-supporting membranes can obtain more sieving channels, as well as better conductivity and hydrophilicity, thereby achieving a better membrane separation performance. Currently, self-supporting MXene membranes are prepared by dry-exfoliation through vacuum filtration or by coating, and such membranes are flexible membranes with a poor mechanical strength and cannot resist the water pressure during the water treatment. For a better application of the MXene separation membranes in water treatment, it is necessary to develop a self-supporting rigid MXene membrane suitable for seawater desalination.

The crucial to preparation of the rigid self-supporting MXene separation membrane is to overcome the poor stability of the MXene in water, namely swelling of the MXene. Patent CN110449032A disclosed a method for delaying swelling of an MXene membrane by modification with sodium alginate. However, the method fails to produce self-supporting membranes, while the sodium alginate may block membrane pores. Li Ding et al. reported a method for overcoming swelling by modifying a surface functional group through an MXene dispersion mixed with an aluminum ion aqueous solution (Ding L, Li L, Liu Y, et al. Effective ion sieving with $Ti_3C_2T_x$ MXene membranes for production of drinking water from seawater [J]. Nature Sustainability, 2020 (3), 296-302). Though, in the method, a membrane is prepared by suction filtration, and ion modification for not less than 30 h should be conducted on the membrane, which is unfavorable for large-scale preparation and cannot achieve a self-supporting structure of the membrane.

SUMMARY

An objective of the present disclosure is to provide a rigid self-supporting MXene separation membrane and a preparation method and use thereof. The MXene separation membrane has a self-supporting rigid structure and a desirable stability in water.

To achieve the above objective, the present disclosure provides the following technical solutions.

The present disclosure provides a preparation method of a rigid self-supporting MXene separation membrane, including the following steps: conducting membrane formation on a mixed powder of MXene and an inorganic metal salt by hot-pressing to obtain the rigid self-supporting MXene separation membrane; where the membrane formation by hot-pressing is conducted at 150° C. to 300° C.

Preferably, the inorganic metal salt includes an aluminum salt.

Preferably, the aluminum salt is one or more selected from the group consisting of aluminum chloride, aluminum sulfate, aluminum nitrate, and aluminum silicate.

Preferably, the MXene is selected from the group consisting of $Ti_3C_2T_x$, $Ti_2CT_x$, $Ti_3CNT_x$, $V_2CT_x$, $Ti_4N_3T_x$, and $Nb_2CT_x$.

Preferably, the MXene and the inorganic metal salt have a mass ratio of 1:(0.02-0.1).

Preferably, the membrane formation by hot-pressing is conducted at 5 MPa to 20 MPa for 5 min to 30 min.

Preferably, a preparation method of the MXene includes the following steps: mixing a MAX material (corresponding to the MXene), lithium fluoride, and a hydrochloric acid solution, and conducting chemical etching of the MAX; conducting solid-liquid separation on an etched product, and mixing an obtained solid precipitate with water; and subjecting a resulting mixture to ultrasonic exfoliation to obtain the MXene.

Preferably, the hydrochloric acid solution has a concentration of 8 mol/L to 12 mol/L; the MAX material and the lithium fluoride have a mass ratio of 1:(1.5-2); the MAX material and the hydrochloric acid solution have a dosage ratio of 1 g:(15-30) mL; and the chemical etching is conducted at 45° C. to 80° C. for 24 h to 48 h.

The present disclosure further provides a rigid self-supporting MXene separation membrane prepared by the preparation method.

The present disclosure further provides use of the rigid self-supporting MXene separation membrane in water treatment.

The present disclosure provides a preparation method of a rigid self-supporting MXene separation membrane, including the following steps: conducting membrane formation on a mixed powder of MXene and an aluminum salt by hot-pressing to obtain the rigid self-supporting MXene separation membrane. In the present disclosure, an MXene material is mixed with an aluminum salt powder, and one-step membrane formation is conducted by hot-pressing; the inorganic metal salt is in a molten state under the hot-pressing, which can assist in the membrane formation; in addition, ionic bonds are broken in the molten state, and free metal cations react with active oxygen-containing functional groups on the surface of the MXene to form new chemical bonds (such as an Al—O bond); such a chemical bond has a higher energy, achieving a desirable anti-swelling effect to improve membrane stability. The self-supporting structure makes the separation membrane have desirable conductivity and hydrophilicity. The results of examples show that: in the present disclosure, the rigid self-supporting MXene separation membrane has a compressive strength of 13 N to 18 N, indicating a desirable mechanical strength, and does not swell after being soaked in water for 48 h, showing high stability in water.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
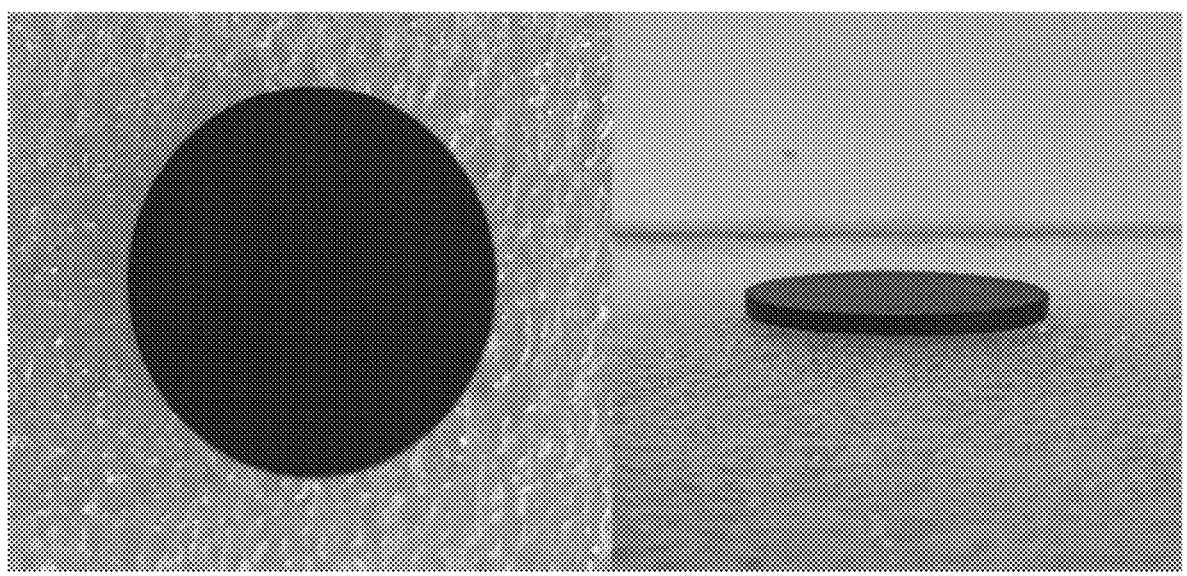
FIGS. 1A & 1B show digital photos of a self-supporting flat separation membrane in Example 1 viewed from different angles.

The present disclosure provides a preparation method of a rigid self-supporting MXene separation membrane, including the following steps: conducting membrane formation on a mixed powder of MXene and an inorganic metal salt by hot-pressing to obtain the rigid self-supporting MXene separation membrane; where the membrane formation by hot-pressing is conducted at 150° C. to 300° C.

In the present disclosure, unless otherwise specified, all raw materials used are commercially available products well known to those skilled in the art.

In the present disclosure, the MXene is preferably selected from the group consisting of $Ti_3C_2T_x$, $Ti_2CT_x$, $Ti_3CNT_x$, $V_2CT_x$, $Ti_4N_3T_x$, and $Nb_2CT_x$.

In the present disclosure, the MXene is preferably prepared by self-making; and a preparation method of the MXene includes preferably the following steps: mixing a MAX material (corresponding to the MXene), lithium fluoride, and a hydrochloric acid solution, and conducting chemical etching on an obtained mixed solution; conducting solid-liquid separation on an etched product, and mixing an obtained solid precipitate with water; and subjecting a resulting mixture to ultrasonic exfoliation to obtain the MXene.

In the present disclosure, the MAX material and the lithium fluoride have a mass ratio of preferably 1:(1.5-2); and the MAX material and the hydrochloric acid solution have a dosage ratio of preferably 1 g:(15-30) mL. The hydrochloric acid solution has a concentration of preferably 8 mol/L to 12 mol/L, more preferably 9 mol/L to 11 mol/L. The mixing includes preferably the following steps: adding ultrapure water into a polytetrafluoroethylene reactor, adding hydrochloric acid and the lithium fluoride, and adding the MAX material. The ultrapure water and the hydrochloric acid are mixed to form the hydrochloric acid solution. The chemical etching is conducted at preferably 45° C. to 80° C. for preferably 24 h to 48 h preferably in a water bath by stirring. There is no special requirement for a stirring speed, and stirring speeds well known in the art can be used.

In the present disclosure, after the chemical etching is completed, the obtained mixture is subjected to solid-liquid separation to obtain a solid precipitate. There is no special requirement for the method of the solid-liquid separation. Preferably, the solid precipitate is washed and then mixed with water for ultrasonic exfoliation. The washing is conducted preferably by acid and water in sequence. The acid washing is conducted using preferably hydrochloric acid with a concentration of 2 mol/L as a lotion by preferably centrifugal washing at preferably 3,000 rpm to 3,500 rpm, to remove residual lithium fluoride. There is no special requirement for a water washing process, as long as the solid precipitate is washed to neutrality.

In the present disclosure, after the washing is completed, the solid precipitate is mixed with water to conduct ultrasonic exfoliation. Preferably, dissolved oxygen in water is removed via introducing argon gas, followed by the ultrasonic exfoliation. There is no special requirement for conditions of the ultrasonic exfoliation, and ultrasonic exfoliation conditions well known in the art can be used. After the ultrasonic exfoliation is completed, the obtained exfoliated material is subjected to suction filtration and collection, followed by vacuum-drying to obtain the MXene.

In the present disclosure, the MXene has a size of preferably not greater than 5 μm.

In the present disclosure, a mixed powder of the MXene and an inorganic metal salt is subjected to membrane formation by hot-pressing to obtain the rigid self-supporting MXene separation membrane.

In the present disclosure, the inorganic metal salt has a particle size of preferably not greater than 5 μm.

In the present disclosure, the inorganic metal salt includes preferably an aluminum salt which is preferably one or more selected from the group consisting of aluminum chloride, aluminum sulfate, aluminum nitrate, and aluminum silicate. When the aluminum salt includes a plurality of the above-mentioned substances, there is no special requirement for a ratio of each aluminum salt, and any ratio can be used.

In the present disclosure, the MXene and the inorganic metal salt have a mass ratio of preferably 1:(0.02-0.1), more preferably 1:(0.04-0.08).

In the present disclosure, there is no special requirement for a preparation method of the mixed powder, as long as the MXene and the inorganic metal salt can be mixed uniformly.

In the present disclosure, the membrane formation by hot-pressing is conducted at 150° C. to 300° C., preferably 200° C. to 300° C., more preferably 220° C. to 280° C. and preferably 5 MPa to 20 MPa, more preferably 10 MPa to 15 MPa for preferably 5 min to 30 min, more preferably 10 min to 20 min. The membrane formation by hot-pressing is conducted preferably in a mold preferably selected according to a shape of the rigid self-supporting MXene separation membrane, which specifically can be a customized flat membrane mold and a tubular membrane mold.

In the present disclosure, during the hot-pressing, the pressure forms the powder into a membrane and imparts rigidity, enabling a self-supporting structure; the heating breaks an ionic bond of an inorganic metal salt to reach a molten ionic state, and free metal cations react with active oxygen-containing functional groups on a surface of the MXene to form new chemical bonds (such as an Al—O bond); such a chemical bond has higher energy, achieving a desirable anti-swelling effect to improve a membrane stability. The separation membrane has excellent conductivity and hydrophilicity.

The present disclosure further provides a rigid self-supporting MXene separation membrane prepared by the preparation method. In the present disclosure, the rigid self-supporting MXene separation membrane is preferably a nanofiltration membrane with a pore size of preferably 2 nm to 10 nm, more preferably 2 nm to 5 nm and a water permeation flux of preferably 40 $L/m^2 \cdot h \cdot bar$ to 55 $L/m^2 \cdot h \cdot bar$.

The present disclosure further provides use of the rigid self-supporting MXene separation membrane or a rigid self-supporting MXene separation membrane prepared by the preparation method in water treatment.

In the present disclosure, there is no special requirement for a use method, and use methods well known in the art can be used.

The rigid self-supporting MXene separation membrane and the preparation method and the use thereof provided by the present disclosure will be described in detail below with reference to examples, but these examples should not be construed as limiting the scope of the present disclosure.

In the following examples, MXene ($Ti_3C_2Tx$) is obtained by etching a MAX phase material ($Ti_3AlC_2$), including the following steps: adding 10 mL of ultrapure water in a polytetrafluoroethylene reactor, adding 30 mL of hydrochloric acid and 3.2 g of lithium fluoride, slowly adding 2 g of the $Ti_3AlC_2$, and stirring an obtained mixture in a 40° C. water bath for 24 h to conduct chemical etching; diluting an obtained precipitate with 2 mol/L hydrochloric acid, and washed twice by centrifugation at 3,000 rpm to remove residual lithium fluoride; further washing an obtained precipitate with ultrapure water until a pH reaches neutrality, removing dissolved oxygen in water by introducing argon, subjecting a resulting mixture to ultrasonic exfoliation for 60 min, and collecting by suction filtration; vacuum-drying a collected material, and storing in a −18° C. freezer under sealing and nitrogen protection for future use.

Example 1

MXene and an $AlCl_3$ powder were uniformly mixed at a mass ratio of 1:0.05 to obtain a mixed powder; 1 g of the mixed powder was added into a customized flat membrane mold with a diameter of 1 cm; and hot-pressing was conducted at 1.5 MPa and 200° C. for 10 min by a hot press, to obtain a self-supporting flat MXene separation membrane with a diameter of 1 cm and a thickness of 2 mm.

Figure 2:
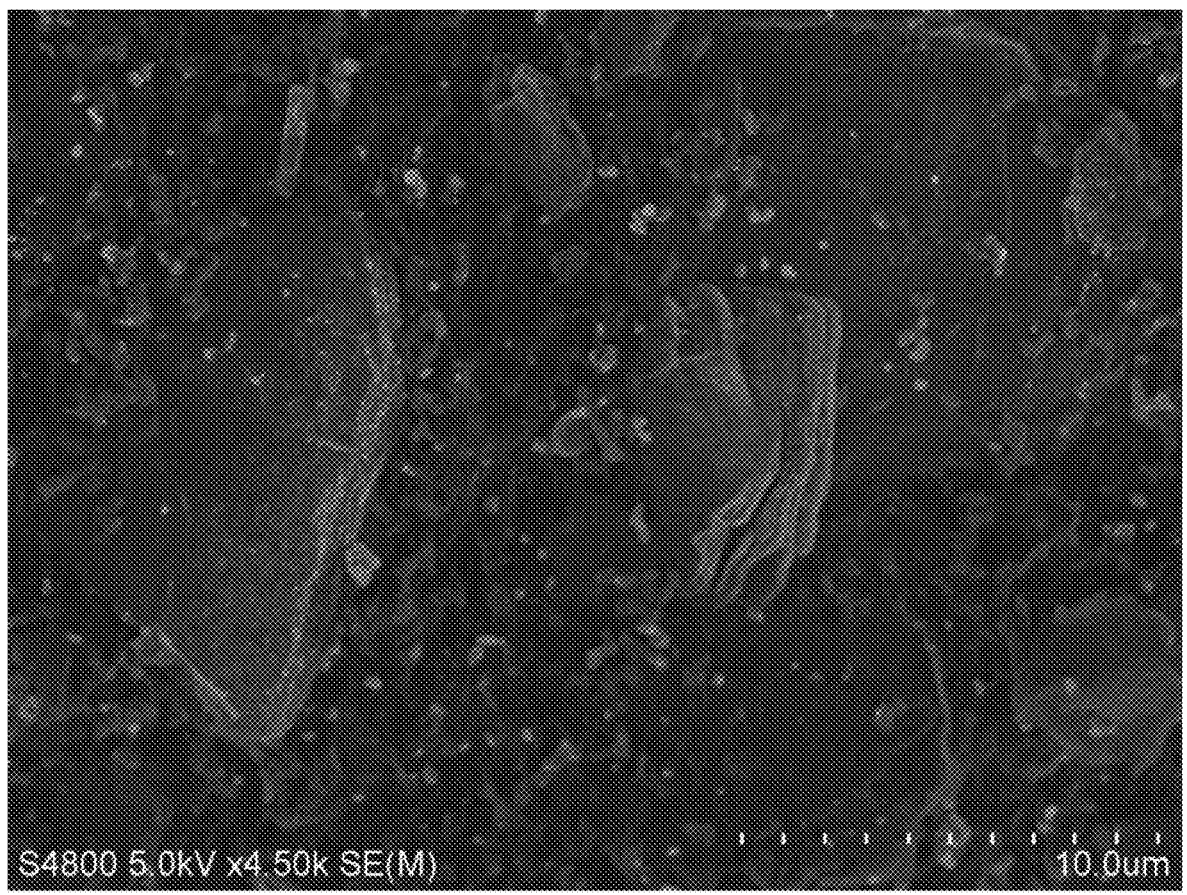
FIG. 2 shows a scanning electron microscopy (SEM) image of the self-supporting flat separation membrane in Example 1.

The self-supporting flat MXene separation membrane of Example 1 was tested. The membrane was a nanofiltration membrane with a pore size of 2 nm to 5 nm, a water permeation flux of 41.1 $L/m^2 \cdot h \cdot bar$, and a conductivity of 324.0 S/m. FIG. 1 shows digital photos of the self-supporting flat separation membrane in Example 1 viewed from different angles. FIG. 2 shows a SEM image of the self-supporting flat separation membrane in Example 1, and FIG. 2 shows that the rigid membrane is composed of lamellar MXene by stacking and inlaying.

Figure 3:
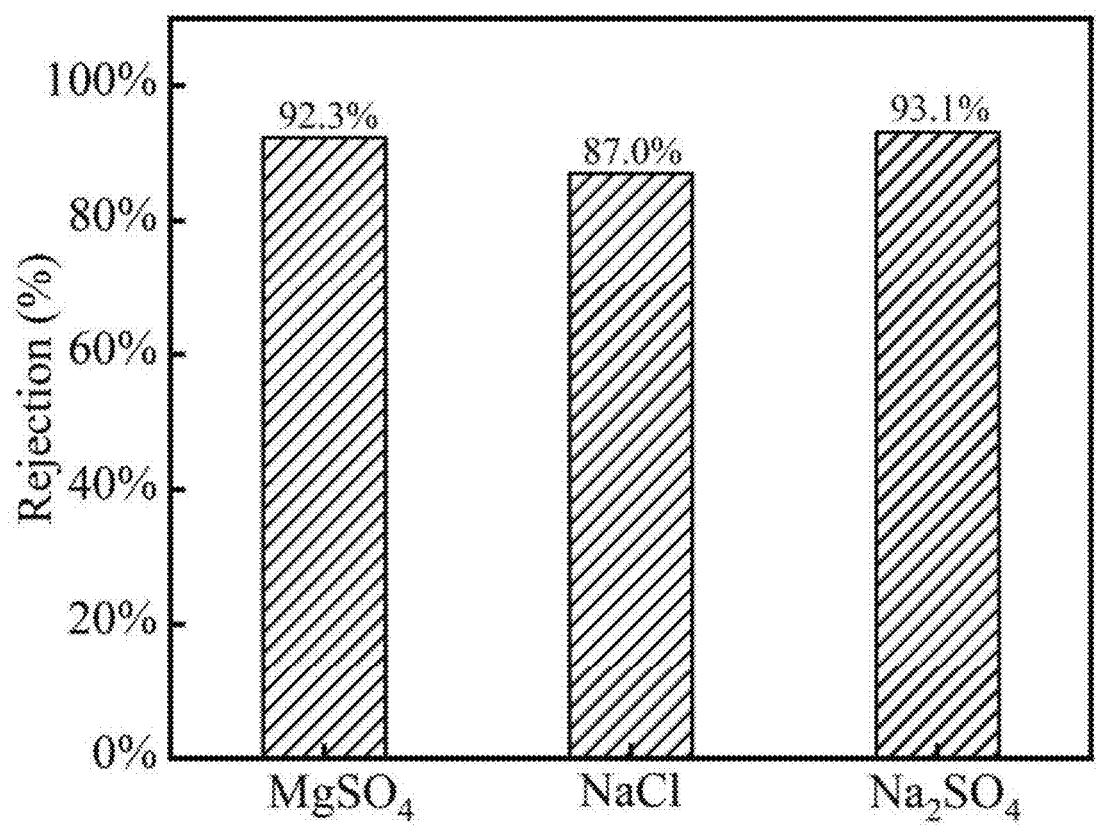
FIG. 3 shows results of an ion rejection of $MgSO_4$, NaCl, and $Na_2SO_4$ by the self-supporting flat separation membrane in Example 1.

An ion rejection of the self-supporting MXene flat separation membrane was tested on $MgSO_4$, NaCl, and $Na_2SO_4$. The test conditions included: the three single-component salt each had a concentration of 5 mmol/L, a voltage of 2 V was supplied on the reactor; the self-supporting rigid membrane was used as a negative electrode, and a titanium mesh was used as a positive electrode, and an external pressure of 0.9 bar was applied. As shown in FIG. 3, the self-supporting flat separation membrane prepared in Example 1 has a desalination effect and could be applied to related fields such as seawater desalination.

Example 2

Figures 4A, 4B:
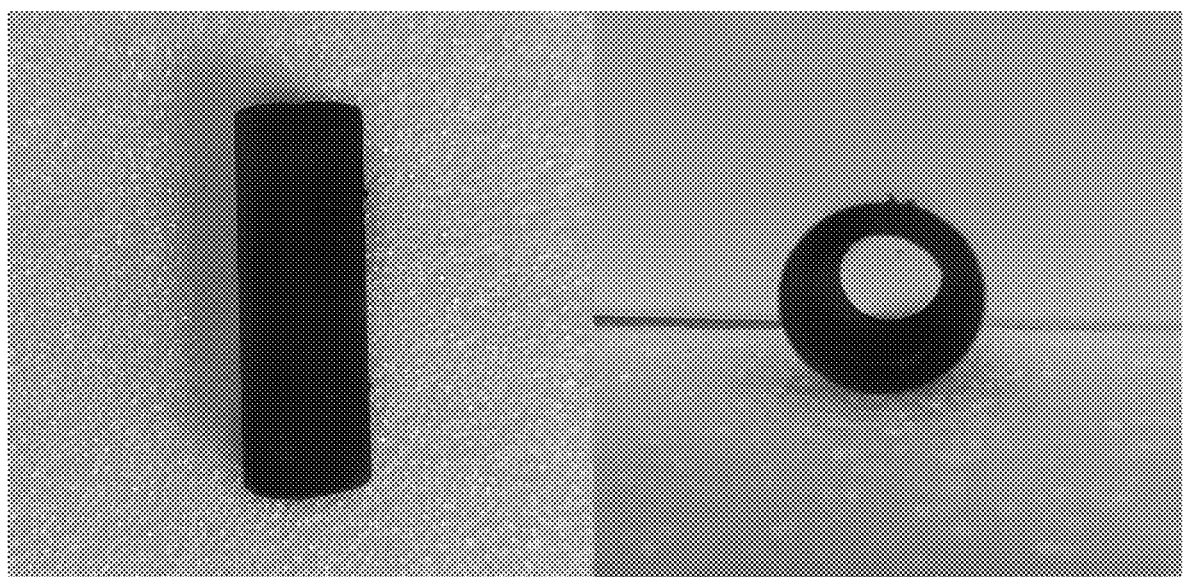
FIGS. 4A & 4B show digital photos of a tubular self-supporting MXene separation membrane prepared in Example 2.

MXene and $Al_2(SO_4)_3$ were uniformly mixed at a mass ratio of 1:0.1 to obtain a mixed powder; 2 g of the mixed powder was added into a customized tubular membrane mold; and hot-pressing was conducted at 15 MPa and 250° C. for 30 min by a hot press, to obtain a tubular self-supporting MXene separation membrane with a diameter of 1.5 cm and a thickness of 1.3 cm. FIG. 4 shows a digital photo of the tubular self-supporting MXene separation membrane prepared in Example 2.

The tubular self-supporting MXene separation membrane of Example 2 was tested. The membrane is a nanofiltration membrane with a pore size of 2-5 nm, and a water permeation flux of 53.2 $L/m^2 \cdot h \cdot bar$. SEM observation of the self-supporting tubular MXene separation membrane prepared in Example 2 shows that the tubular self-supporting MXene separation membrane is composed of lamellar MXene by stacking and inlaying.

Comparative Example 1

This example differed from Example 1 only in that the $AlCl_3$ powder was not added, specifically: 1 g of MXene was added into a customized flat membrane mold with a diameter of 1 cm; and hot-pressing was conducted at 15 MPa and 200° C. for 10 min by a hot press, to obtain a flat membrane with a diameter of 1 cm and a thickness of 2 mm.

The flat membrane of Comparative Example 1 was tested, and the flat membrane was a nanofiltration membrane with a pore size of 2 nm to 4 nm.

Figure 5A:
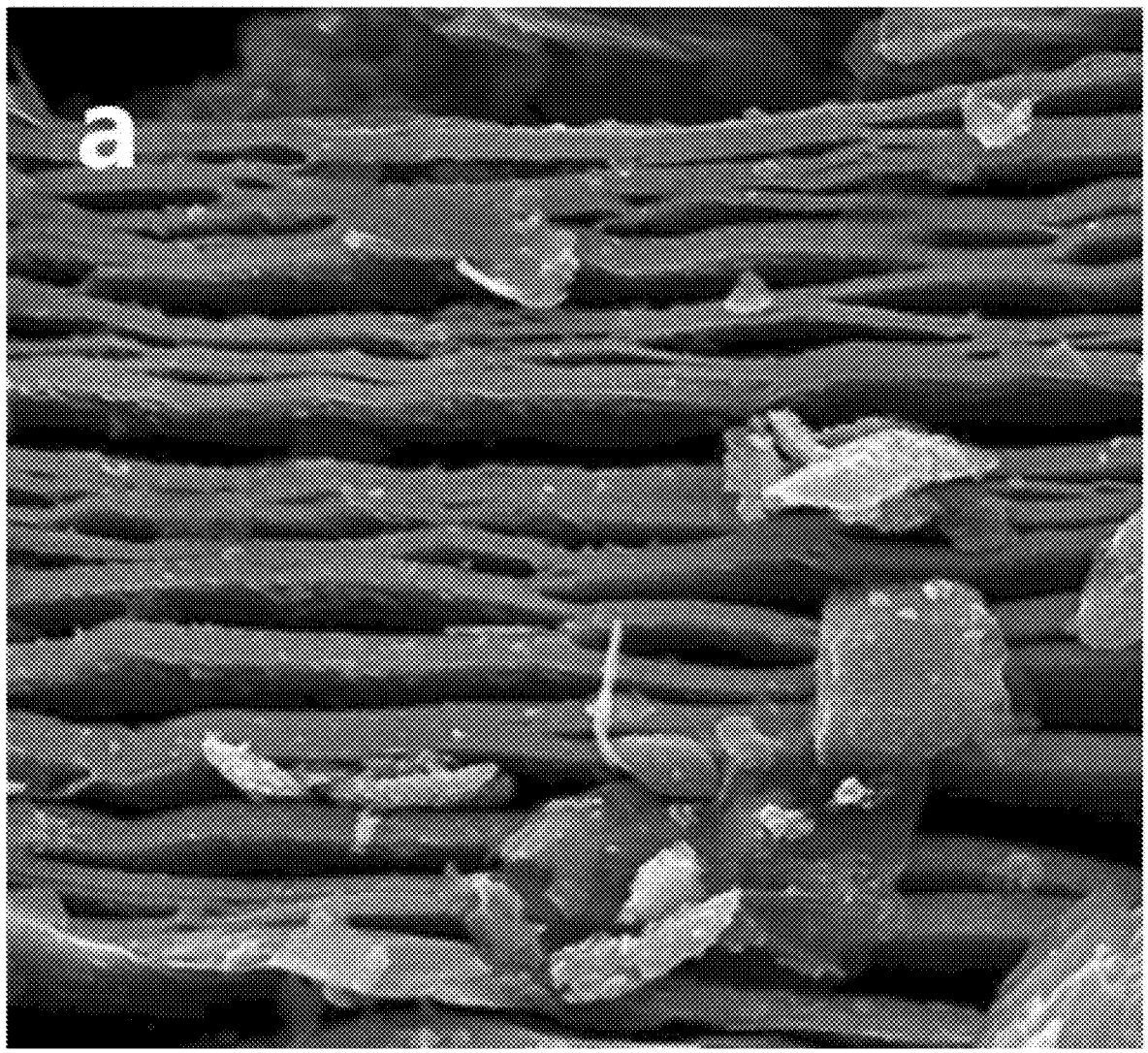
FIGS. 5A & 5B show SEM images of membranes in Example 1 and Comparative Example 1 after being soaked in water for 48 h.
Figure 5B:
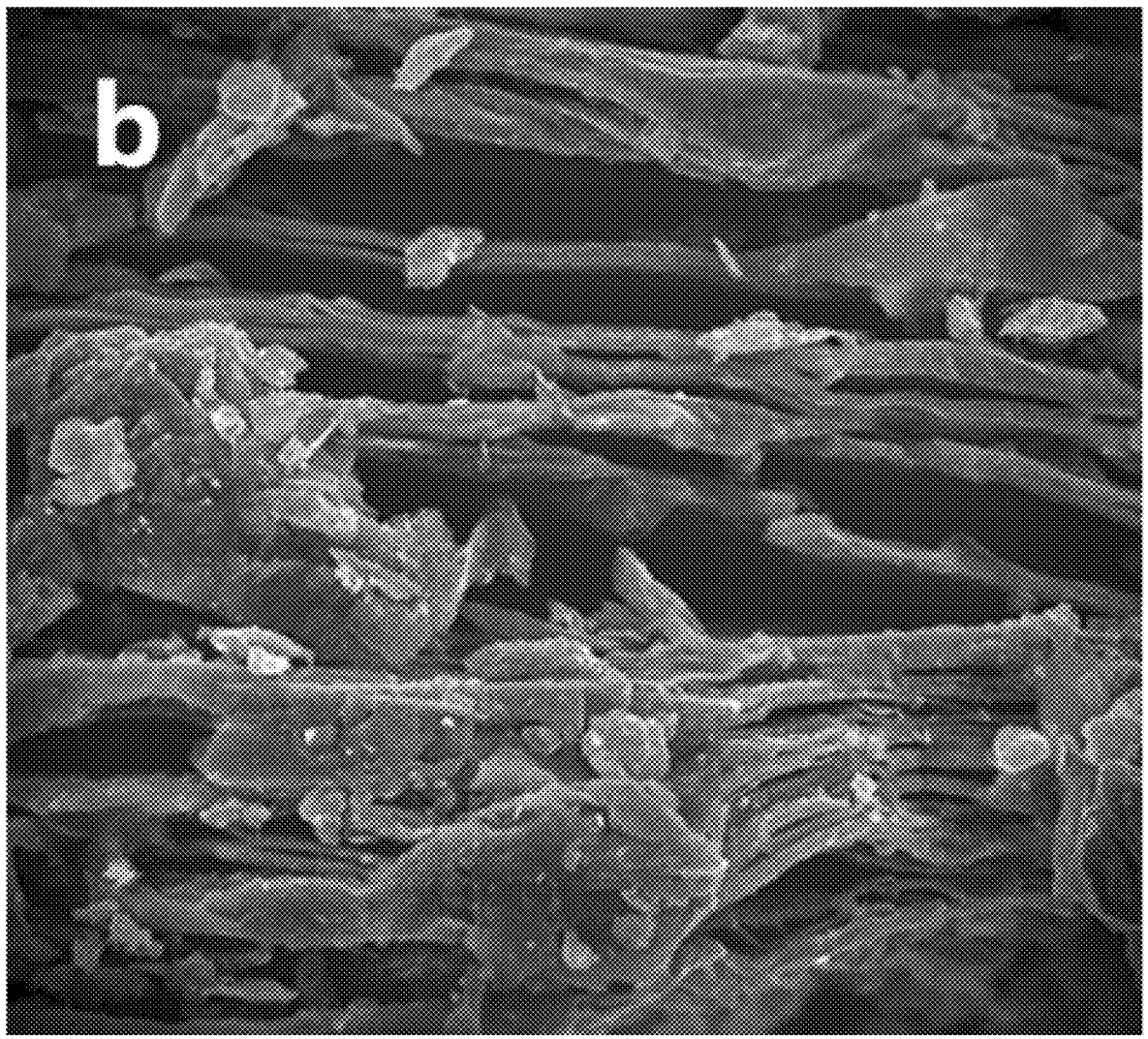

The membranes of Example 1 and Comparative Example 1 were soaked in water for 48 h, and then observed by SEM separately. FIG. 5A corresponds to Example 1, and FIG. 5B corresponds to Comparative Example 1. Unlike the case with inorganic metal salts (FIG. 5B), the membrane obtained without the inorganic metal salt swelled seriously after soaking for 48 h in water (FIG. 5B).

Figure 6:
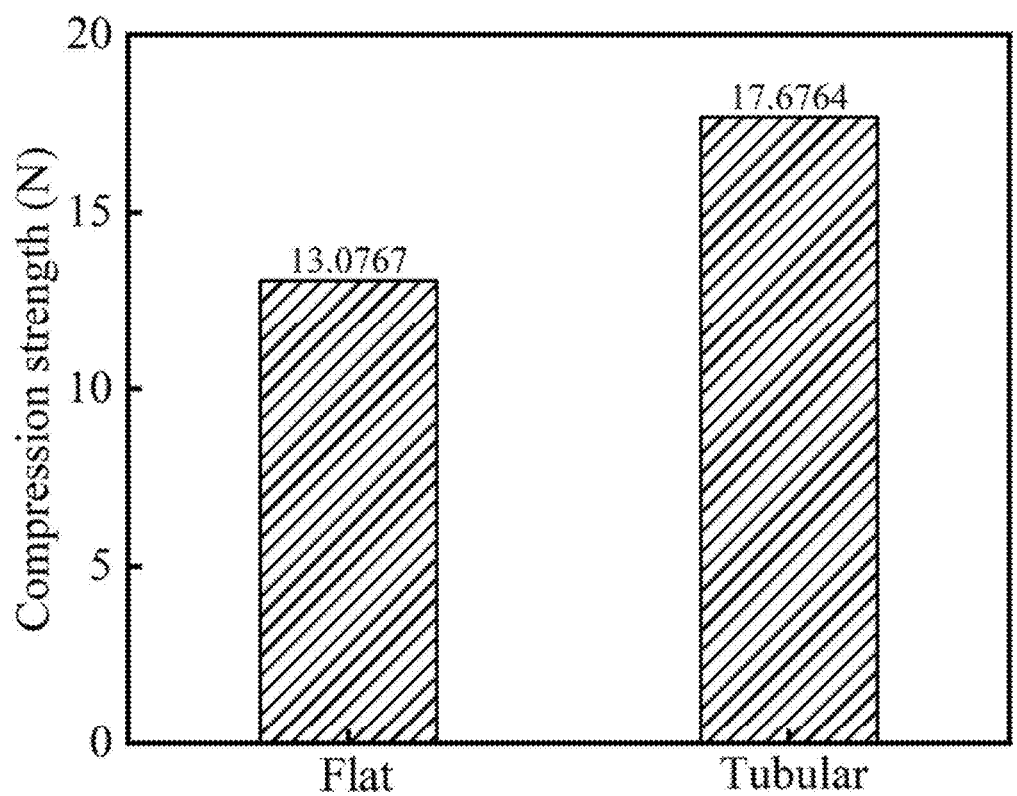
FIG. 6 shows compression strength test results of separation membranes in Example 1 and Example 2.

A compression strength test was conducted on the separation membranes prepared in Examples 1 and 2 on an electronic universal testing machine: a pressure was continuously applied to a membrane surface by a pressure probe until the rigid membrane ruptured, and a last value before rupture was regarded as a compressive strength. The results are shown in FIG. 6, the separation membranes prepared in Examples 1 and 2 each has a desirable mechanical strength.

Figure 7A:
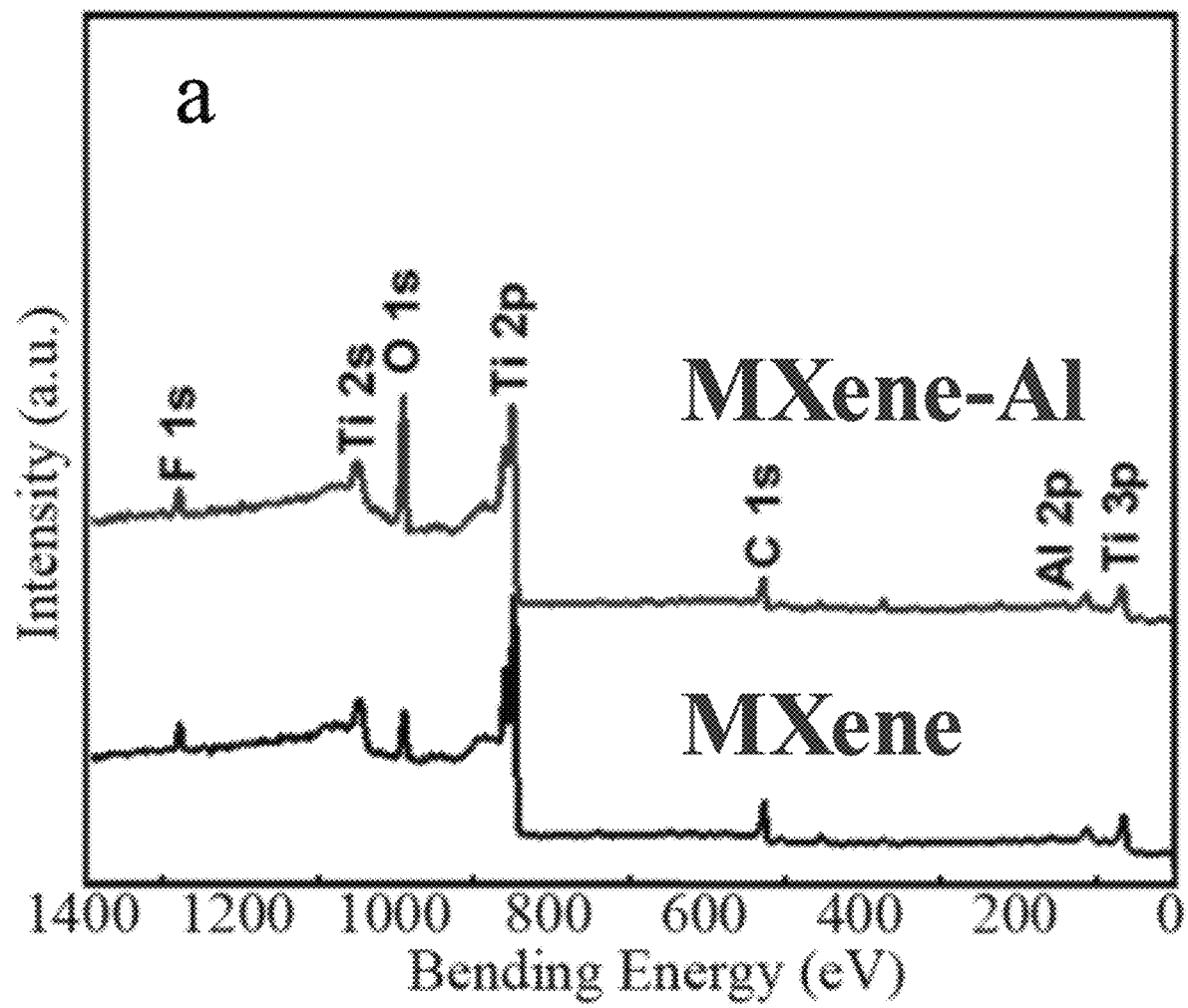
FIGS. 7A-7C show test results of an X-ray photoelectron spectrometer of separation membrane in Example 1.
Figure 7B:
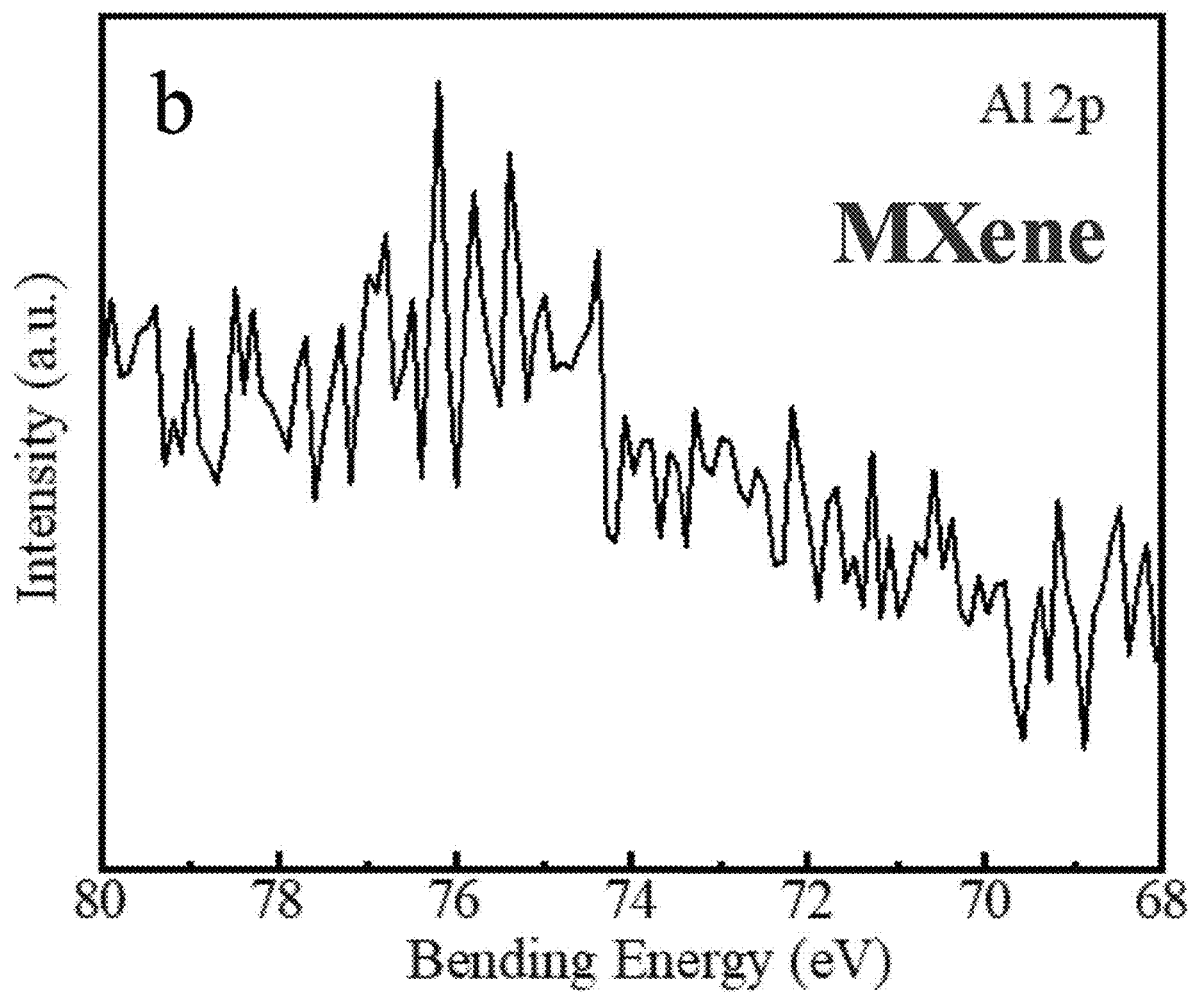
Figure 7C:
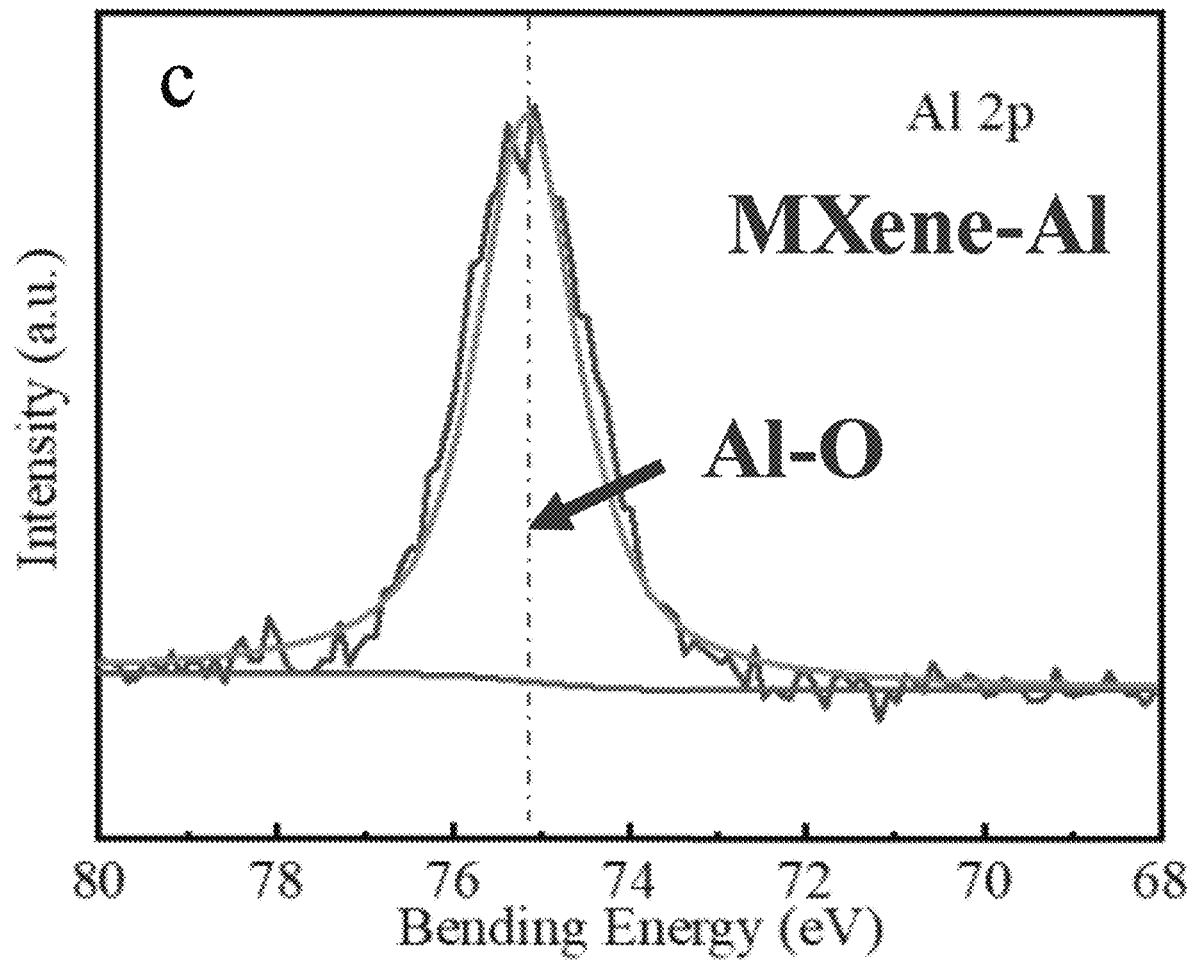

An X-ray energy spectrum test was conducted on the separation membrane prepared in Example 1 (FIGS. 7A-7C). There was an X-ray energy spectrum comparison diagram of Example 1 with a pure MXene membrane (FIG.

7A); there was an Al 2p position energy spectrum of the pure MXene membrane (FIG. 7B); and there was an Al 2p position energy spectrum of Example 1, there was an obvious characteristic peak at 75.1 eV, belonging to an Al—O bond (FIG. 7C). There was no aluminum element in the pure MXene membrane (FIG. 7B); and FIG. 7C proved that aluminum ions were introduced to react with oxygen-containing groups on the surface of the MXene to form the Al—O bond, playing a role in resisting swelling. This indicates that the separation membrane prepared by the present disclosure has a desirable stability in water.

Figure 8:
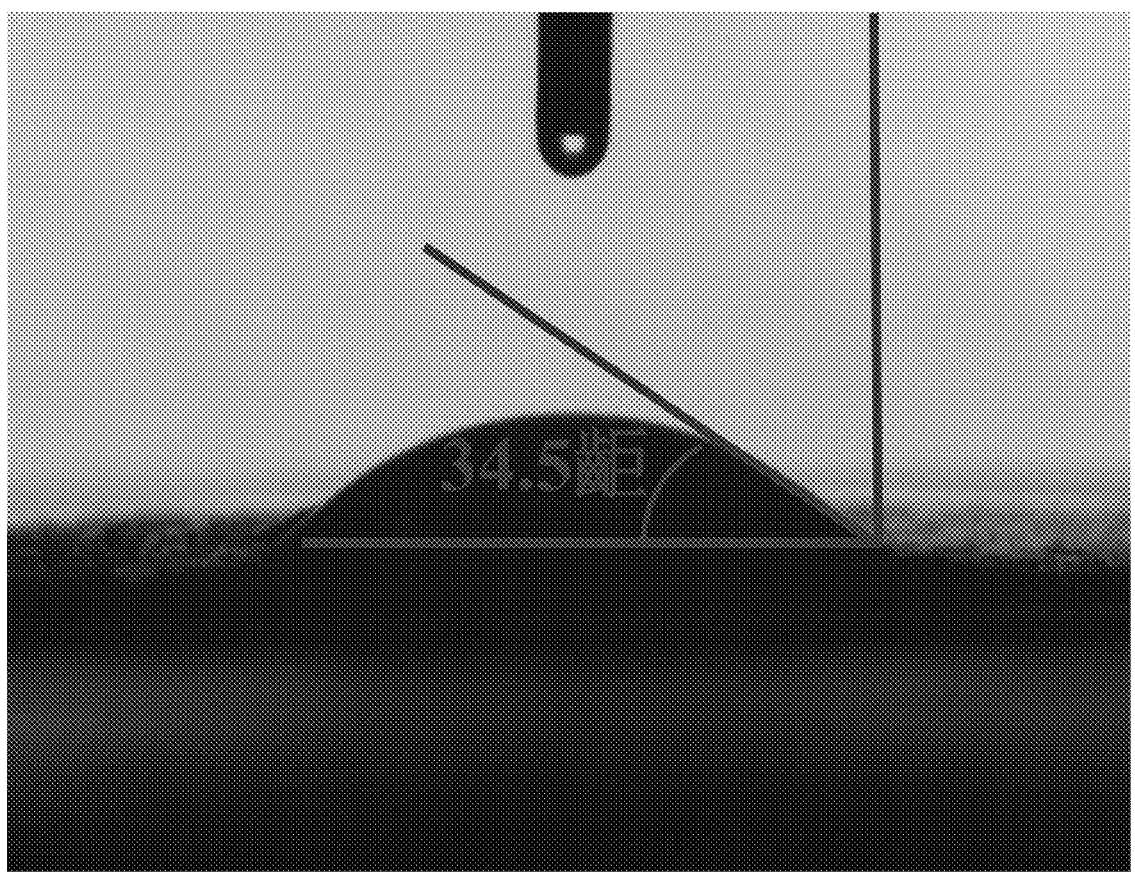
FIG. 8 shows a test result of a water contact angle of separation membrane in Example 1.

A water contact angle test was conducted on the separation membrane prepared in Example 1 (FIG. 8). The as-fabricated membrane has a hydrophilic surface with a water contact angle of 34.5°.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of a rigid self-supporting MXene separation membrane, comprising the following steps:
   conducting membrane formation on a mixed powder of MXene and an inorganic metal salt by hot-pressing to obtain the rigid self-supporting MXene separation membrane; wherein the membrane formation by hot-pressing is conducted at 150° C. to 300° C. and 5 MPa to 20 MPa for 5 min to 30 min;
   the MXene and the inorganic metal salt have a mass ratio of 1:(0.02-0.1); and
   the inorganic metal salt comprises an aluminum salt.

2. The preparation method according to claim 1, wherein the aluminum salt is one or more selected from the group consisting of aluminum chloride, aluminum sulfate, aluminum nitrate, and aluminum silicate.

3. The preparation method according to claim 1, wherein the MXene is selected from the group consisting of $Ti_3C_2T_x$, $Ti_2CT_x$, $Ti_3CNT_x$, $V_2CT_x$, $Ti_4N_3T_x$, and $Nb_2CT_x$.

4. The preparation method according to claim 1, wherein a preparation method of the MXene comprises the following steps:
   mixing a MAX material (corresponding to the MXene), lithium fluoride, and a hydrochloric acid solution and conducting chemical etching on an obtained mixed solution;
   conducting solid-liquid separation on an etched product, and mixing an obtained solid precipitate with water; and
   subjecting a resulting mixture to ultrasonic exfoliation to obtain the MXene.

5. The preparation method according to claim 4, wherein the hydrochloric acid solution has a concentration of 8 mol/L to 12 mol/L, the MAX material and the lithium fluoride have a mass ratio of 1:(1.5-2), the MAX material and the hydrochloric acid solution have a dosage ratio of 1 g:(15-30) mL, and the chemical etching is conducted at 45° C. to 80° C. for 24 hours to 48 hours.

6. A rigid self-supporting MXene separation membrane prepared by the preparation method according to claim 1.

7. The rigid self-supporting MXene separation membrane according to claim 6, wherein the aluminum salt is one or more selected from the group consisting of aluminum chloride, aluminum sulfate, aluminum nitrate, and aluminum silicate.

8. The rigid self-supporting MXene separation membrane according to claim 6, wherein the MXene is selected from the group consisting of $Ti_3C_2T_x$, $Ti_2CT_x$, $Ti_3CNT_x$, $V_2CT_x$, $Ti_4N_3T_x$, and $Nb_2CT_x$.

9. The rigid self-supporting MXene separation membrane according to claim 6, wherein a preparation method of the MXene comprises the following steps:
   mixing a MAX material (corresponding to the MXene), lithium fluoride, and a hydrochloric acid solution, and conducting chemical etching on an obtained mixed solution;
   conducting solid-liquid separation on an etched product, and mixing an obtained solid precipitate with water; and
   subjecting a resulting mixture to ultrasonic exfoliation to obtain the MXene.

10. The rigid self-supporting MXene separation membrane according to claim 9, wherein the hydrochloric acid solution has a concentration of 8 mol/L to 12 mol/L, the MAX material and the lithium fluoride have a mass ratio of 1:(1.5-2), the MAX material and the hydrochloric acid solution have a dosage ratio of 1 g:(15-30) mL, and the chemical etching is conducted at 45° C. to 80° C. for 24 hours to 48 hours.

* * * * *